A. WOOD.
Assignor to the SAWYER SPINDLE COMPANY.
SPINDLE SUPPORT FOR SPINNING MACHINES.
No. 10,897. Reissued Jan. 31, 1888.
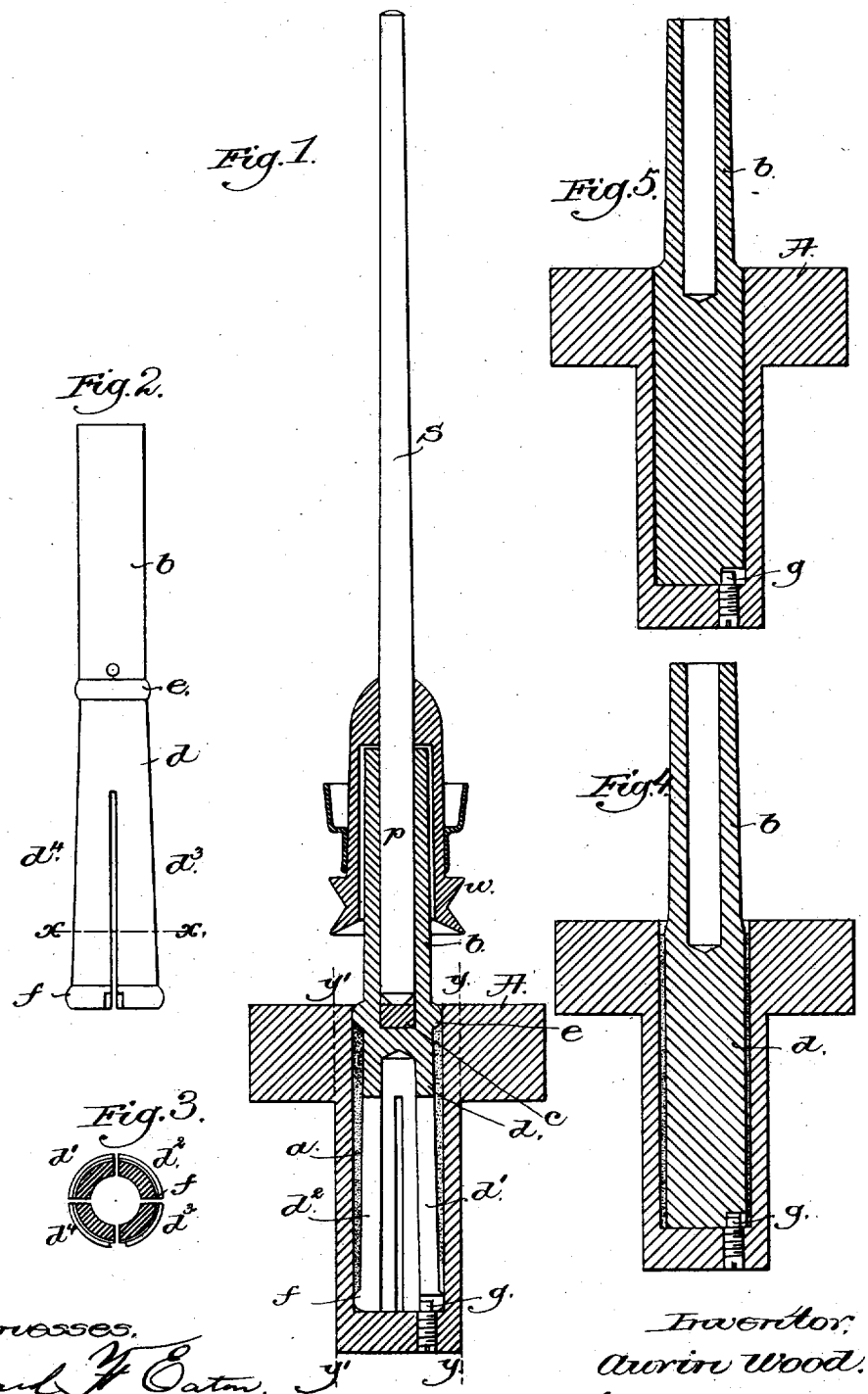
N. PETERS, Photo-Lithographer, Washington, D. C.

UNITED STATES PATENT OFFICE.

AURIN WOOD, OF WORCESTER, ASSIGNOR TO THE SAWYER SPINDLE COMPANY, OF BOSTON, MASSACHUSETTS.

SPINDLE-SUPPORT FOR SPINNING-MACHINES.

SPECIFICATION forming part of Reissued Letters Patent No. 10,897, dated January 31, 1888.

Original No. 364,880, dated June 14, 1887. Application for reissue filed July 20, 1887. Serial No. 244,834.

*To all whom it may concern:*

Be it known that I, AURIN WOOD, of Worcester, county of Worcester, and State of Massachusetts, have invented an Improvement in Spindle-Supports for Spinning-Machines, of which the following description, in connection with the accompanying drawings, is a specification, like letters on the drawings representing like parts.

This invention has for its object to simplify and cheapen the production of that class of spindle-supports wherein the bolster constitutes the sole lateral bearing for the spindle, and wherein the bolster is held loosely, so as to compensate for or obviate injurious jar or gyration in the spindle.

In accordance with my invention the bolster, made as a rigid sleeve and constituting the sole lateral support for the spindle above the bolster-rail and within the sleeve-whirl, is extended below the step to form a shank, the said shank entering loosely a socket made in the bolster-rail, the shank being so constructed or held as to permit the bolster to have a limited movement with the spindle as the lower end of the spindle moves under an unbalanced load. For the best results the shank of the bolster, made as a longitudinal prolongation thereof below the step, is made as a split sleeve to constitute spring-arms; yet this shank may be solid and be loose in the socket, and be surrounded or not, as desired, by a fibrous or elastic packing of usual construction.

In this my invention I am enabled to do away with the usual bolster-case, thus dispensing with one piece, and by extending only the bolster, made as a single tube, into the sleeve-whirl the latter may be made of smaller diameter than when a bolster-case with a loose bolster is employed within the whirl.

Figure 1 shows my improved bolster, the bolster-rail to hold it, packing, and sleeve-whirl, all in section, the spindle shown in the bolster being in elevation; Fig. 2, a detail of the bolster alone with the packing removed; Fig. 3, a section of Fig. 2 in the dotted line *x;* Fig. 4, a modification showing the shank made solid and surrounded by elastic packing, and Fig. 5 a like section with the packing omitted.

The spindle *s*, having a pintle, *p*, and the sleeve-whirl *w* are all as usual. The bolster-rail A, herein shown as T-shaped in cross-section, is made thicker than usual, and its thickened portion is provided with sockets *a*—one socket for the shank of each spindle-bolster.

My improved bolster consists of a tubular portion, *b*, bored to receive the pintle *p* of the spindle *s*, the latter running upon a suitable step, C, in the bolster, which is closed to constitute an oil-well. The external diameter of the bolster is enough smaller than the internal diameter of the sleeve-whirl to enable the latter to surround but not touch the bolster, which only is interposed between the pintle and sleeve-whirl. The bolster has a shank, *d*, forming a continuation of it in the line of the pintle-receiving socket or portion *b*, the said shank extended below the step being preferably composed of a tube-like portion slotted at two or more places to leave spring-arms $d'$ $d^2$, &c. The external diameter of the shank *d* is such as to enable it to be inserted directly in the socket *a* in the rail A, where it will be held without the intervention of a bolster-case in such manner that the said bolster will be free to move therein in substantially any and every direction as the foot of the spindle moves laterally when traveling with an unevenly-balanced load.

As herein shown, the bolster is provided with two series of projections, *e f*, which bear snugly against the rail at the interior of the socket *a*. The shank *d* has co-operating with it a pin or projection, *g*, which restrains the rotation of the bolster with the spindle.

If desired, the parts of the bolster-rail to the right and to the left of the lines *y y* and $y'$ $y'$, respectively, may be omitted.

In Fig. 1 I have shown the shank of the bolster as surrounded by an elastic packing, *h;* but this packing may be omitted, as in Figs. 2 and 5, and the shank of the bolster unprotected by the packing may be set into the socket *a*.

In Fig. 4 I have shown the shank of the bolster as made solid and of uniform diameter, the shank being surrounded by an elastic packing; but the packing may be omitted, the bolster-shank in that case loosely fitting the interior of the socket.

The bolster herein shown and described is very efficient in operation, is very durable and simple in construction, is very cheap to produce, and is light in weight.

I do not herein claim a bolster having a spring-shank at right angles to the pintle-receiving socket; nor do I claim a spring post or stud to hold the bolster upon or above the rail and at one side the longitudinal center of the spindle.

I claim—

1. A spindle-bolster consisting, essentially, of a socketed pintle-receiving portion having a shank forming a prolongation of the said socketed portion, combined with a bolster-rail having a socket closed at its bottom for the reception of the said shank, substantially as described.

2. A spindle-bolster consisting, essentially, of a socketed pintle-receiving portion having a shank forming a prolongation of the said socketed portion, combined with a bolster-rail having a socket for the reception loosely of the said shank, substantially as described.

3. A spindle-bolster consisting, essentially, of a socketed pintle-receiving portion having a shank forming a prolongation of the said socketed portion, combined with a bolster-rail having a socket closed at its bottom for the reception of the said shank, and with means, substantially as described, to restrain the rotation of the bolster in the said socket.

4. A spindle-bolster consisting, essentially, of a socketed pintle-receiving portion having a shank forming a prolongation of the said socketed portion, and the elastic packing interposed directly between the shank of the bolster and the interior of the socket in the rail, combined with a bolster-rail having a socket closed at its bottom for the reception of the said shank, substantially as described.

AURIN WOOD.

Witnesses:
E. D. BANCROFT,
H. F. SEARLES.